United States Patent
Hwang et al.

(10) Patent No.: US 7,043,116 B2
(45) Date of Patent: May 9, 2006

(54) DUAL-PORT BROADBAND LIGHT SOURCE WITH INDEPENDENTLY CONTROLLABLE OUTPUT POWERS

(75) Inventors: Seong-Taek Hwang, Pyeongtaek-si (KR); Yun-Je Oh, Yongin-si (KR); Kwan-Soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 10/825,813

(22) Filed: Apr. 16, 2004

(65) Prior Publication Data

US 2005/0069252 A1 Mar. 31, 2005

(30) Foreign Application Priority Data

Sep. 30, 2003 (KR) .................. 10-2003-0070431

(51) Int. Cl.
*G02B 6/26* (2006.01)
*H01S 3/00* (2006.01)

(52) U.S. Cl. .................. 385/27; 359/341.2; 359/341.3

(58) Field of Classification Search .................. None
See application file for complete search history.

(56) References Cited

U.S. PATENT DOCUMENTS 6,507,429 B1 * 1/2003 Ales et al. ............... 359/341.1
2001/0046364 A1 * 11/2001 Ajima et al. ................ 385/142

* cited by examiner

*Primary Examiner*—Juliana Kang
(74) *Attorney, Agent, or Firm*—Cha & Reiter, L.L.C.

(57) ABSTRACT

A dual-port broadband light source with independently controllable output powers includes a broadband light source having a first gain medium pumped by an input pump light in order to output a first amplified spontaneous emission through both ends thereof. A second gain medium pumped by another input pump light in order to output a second amplified spontaneous emission through both ends thereof. A reflector disposed between the opposite ends of the first and second gain mediums to reflect the input first and second amplified spontaneous emissions. The first and second amplified spontaneous emissions output from the first and second gain mediums are then output to the outside through first and second output terminals.

16 Claims, 4 Drawing Sheets

DUAL-PORT BROADBAND LIGHT SOURCE WITH INDEPENDENTLY CONTROLLABLE OUTPUT POWERS

CLAIM OF PRIORITY

This application claims priority to an application entitled "DUAL-PORT BROADBAND LIGHT SOURCE WITH INDEPENDENTLY CONTROLLABLE OUTPUT POWERS," filed in the Korean Intellectual Property Office on Sep. 30, 2003 and assigned Ser. No. 2003-70431, the contents of which are hereby incorporated by reference.

BACKGROUND OF THE INVENTION

1. Field of the Invention

The present invention relates to an optical module. More particularly, the present invention relates to a dual-port broadband light source that is adapted for outputting light having a broad wavelength band.

2. Description of the Related Art

In the field of optical communications, it is generally required that a light source has a broad wavelength band in order to measure optical characteristics of various elements used for the optical communication. The aforementioned is particularly true when an erbium doped fiber amplifier (EDFA) is used for an optical communication system, wherein the wavelength band of an optical signal for communication is 1520 nm to 1620 nm. Consequently, a light source is required that is capable of measuring characteristics of various optical elements in the 1520 nm to 1620 nm wavelength band. Recently, a broadband light source used with an injection locked laser diode for accommodating many subscribers at the same time, such as in a wavelength division multiplexing passive optical network (WDM-PON) has been receiving attention for possible deployment in a prospective super-high speed optical subscriber network. The conventional commercial broadband light source typically uses a white light source or an amplified spontaneous emission (ASE) of the EDFA. However, the conventional white light source has a low output. Consequently, the conventional white light source is not properly used in the case of a WDM-PON requiring a high output or used to measure the characteristics of the optical elements. On the other hand, the EDPA is not economical.

U.S. Pat. No. 6,507,429 entitled "ARTICLE COMPRISING A HIGH POWER/BROAD SPECTRUM SUPERFLUORESCENT FIBER RADIATION SOURCE", which has been invented by and granted to Gaelle Ales et al. and incorporated by reference as background material, discloses a light source comprising: first and second optical fibers doped with rare earth elements; an optical isolator disposed between the first and second optical fibers; a first pump light source for pumping the first optical fiber; a second pump light source for pumping the second optical fiber; and a reflector for utilizing an amplified spontaneous emission output from the first optical fiber.

However, in the conventional broadband light source with the above-stated construction, the optical isolator disposed between the first and second optical fibers is created from the second optical fiber. The result is that the amplified spontaneous emission moving from the second optical fiber to the first optical fiber is intercepted. Consequently, there is a degree of energy loss, thereby reducing output efficiency to unsatisfactory levels. In addition, when the output of the first pump light source is changed to control the output of the first optical fiber, the output of the second optical fiber is also changed. Consequently, independent output control of the first and second optical fibers is difficult to achieve and efficiency suffers.

SUMMARY OF THE INVENTION

Therefore, the present invention has been made at in part in view of the above-mentioned problems. It is, therefore, an aspect of the present invention to provide a dual-port broadband light source with high output power, satisfactory output efficiency, and independently controllable output powers.

In accordance with the present invention, the above and other aspects can be accomplished by the provision of a dual-port broadband light source with independently controllable output powers, including a first gain medium pumped by an input pump light that outputs a first amplified spontaneous emission through both ends thereof, and a second gain medium pumped by an input pump light to output a second amplified spontaneous emission through both ends thereof. A reflector is disposed between opposite ends of the first and second gain mediums to reflect the first and second input amplified spontaneous emissions. The first and second amplified spontaneous emissions is then output from the first and second gain mediums are then output to the outside through the first and second output terminals.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE INVENTION

Now, preferred aspects of the present invention will be described in detail with reference to the annexed drawings. In the following, a detailed description of known functions and configurations incorporated herein will be omitted when it may obscure the subject matter of the present invention.

Figure 1:
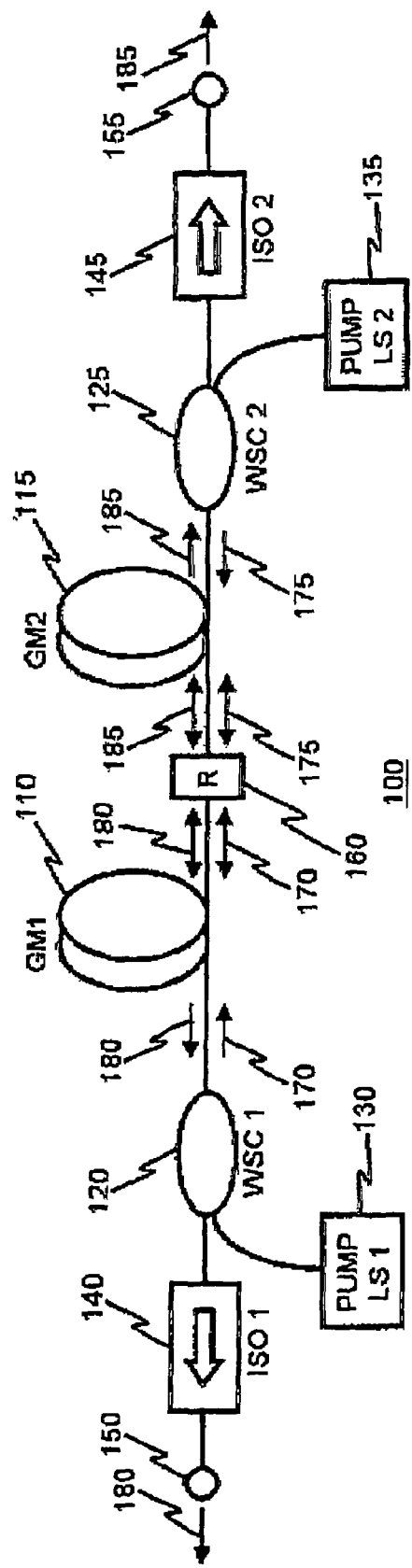
FIG. 1 is a schematic view illustrating the structure of a broadband light source according to a first aspect of the present invention.

FIG. 1 is a schematic illustration of the structure of a broadband light source 100 according to a first aspect of the present invention. The broadband light source 100 comprises: a first gain medium (GM1) 110 and a second gain medium (GM2) 115; a first wavelength selective coupler (WSC1) 120 and a second wavelength selective coupler (WSC2) 125; a first pump light source (LS1) 130 and a second pump light source (LS2) 135; a reflector (R) 160; and a first optical isolator (ISO1) 140 and a second optical isolator (ISO2) 145.

The first pump light source 130 outputs a first pump light 170 having a predetermined wavelength, and the first wavelength selective coupler 120 outputs the input first pump light 170 to the first gain medium 110. Thus, the first gain medium 110 is pumped by means of the first pump light 170. A created first amplified spontaneous emission 180 is output through both ends of the first gain medium 110.

The first optical isolator 140 permits the first amplified spontaneous emission input 80 to pass therethrough, and the isolator intercepts the light input in the opposite direction.

The second pump light source 135 outputs a second pump light 175 having a predetermined wavelength. In addition, the second wavelength selective coupler 125 will output the second pump light 175 to the second gain medium 115.

The second gain medium 115 is pumped by the second pump light 175. A second created amplified spontaneous emission 185 is output through both ends of the second gain medium 115.

The second optical isolator 145 allows the input second amplified spontaneous emission 185 to pass therethrough, and intercepts the light input in the opposite direction.

Each of the first and second gain mediums 110 and 115 may include a rare earth element doped optical fiber, or a rare earth element doped planar light wave circuit. With regard to the rare earth element doped optical fiber, there can be, for example, an erbium doped optical fiber (EDF), a thulium doped fiber (TDF), or a praseodymium doped fiber (PDF) that may be used. The erbium doped optical fiber is used especially in a particular wavelength band range of 1520 to 1570 nm when the length of the fiber is shortened, or the output of the pump light is increased, i.e., when the population inversion is increased. On the other hand, the erbium doped optical fiber can also be used in a wavelength band range of 1520 to 1620 nm when the length of the fiber is lengthened or the output of the pump light is decreased, i.e., such as when the population inversion is decreased. The thulium doped fiber is preferably used in a wavelength band range of 1450 to 1510 nm, and praseodymium doped fiber is preferably used in a wavelength band range of 1270 to 1330 nm. The first and second pump lights (170 and 175) have wavelengths capable of exciting the first and second gain mediums 110 and 115 according to types of the first and second gain mediums 110 and 115. The types of the first and second gain mediums 110 and 115, wherein each has a large gain spectrum in a desired usable wavelength band of the broadband light source 100 can be selected, and the types of the first and second pump light sources 130 and 135 capable of exciting the first and second gain mediums 110 and 115 can also be selected.

The first amplified spontaneous emission 180 is output to the rear of the first gain medium 110, and the emission passes through the first wavelength selective coupler 120 and then the first optical isolator 140. The emission 180 is then output to the outside through a first output terminal 150 of the broadband light source 100. The first amplified spontaneous emission 180, which is output from the front of the first gain medium 110, is reflected by the reflector 160, and is then input to the first gain medium 110 again. The first amplified spontaneous emission 180 is then amplified again by the first gain medium 110, that passes through the first wavelength selective coupler 120 and the first optical isolator 140, and is then output to the outside though the first output terminal 150 of the broadband light source 100. The first pump light 170, which left the first gain medium after exciting the first gain medium 110, is subsequently reflected by the reflector 160, and is then input back to the first gain medium 110 again. Consequently, amplification efficiency is improved. The second amplified spontaneous emission 185, which is output from the front of the second gain medium 115, passes through the second wavelength selective coupler 125 and the second optical isolator 145, and is then output to the outside though a second output terminal 155 of the broadband light source 100. The second amplified spontaneous emission 185 outputs to the rear of the second gain medium 115 is reflected by the reflector 160, and is then input back to the second gain medium 115 again. The second amplified spontaneous emission 185 is amplified again by the second gain medium 115 and passes through the second wavelength selective coupler 125 and the second optical isolator 145 before being output to the outside though the second output terminal 155 of the broadband light source 100. The second pump light 175 left, which after exciting the second gain medium 115 is reflected by means of the reflector 160, is then input back to the second gain medium 115 again. Consequently, amplification efficiency is improved.

Figure 2:
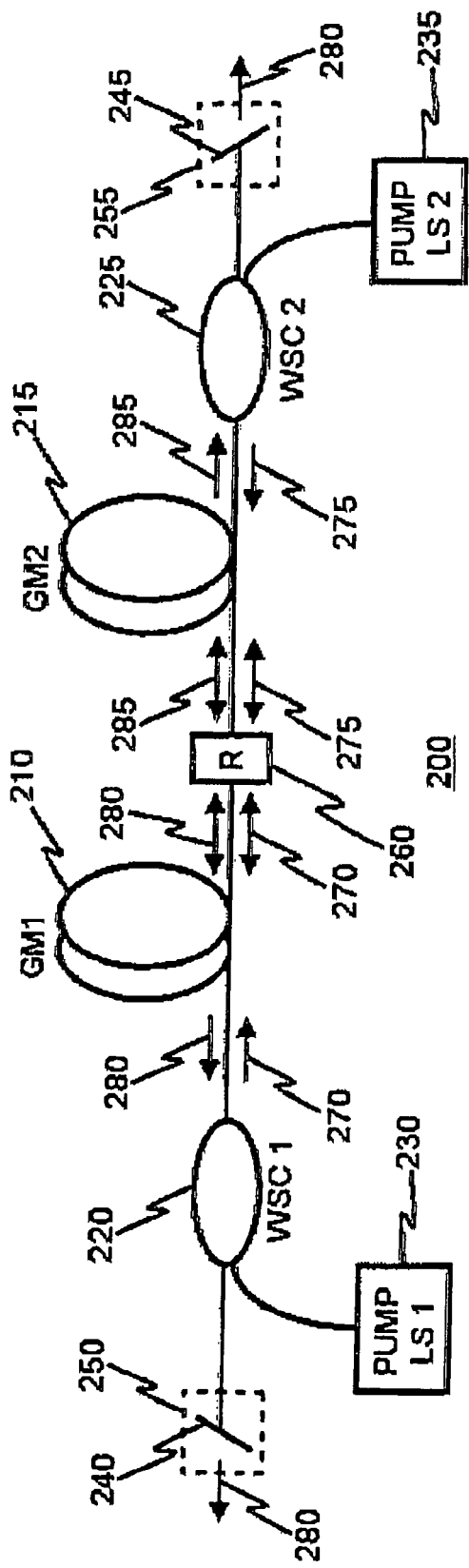
FIG. 2 is a schematic view illustrating the structure of a broadband light source according to a second aspect of the present invention.

FIG. 2 is a schematic view of the structure of a broadband light source 200 according to a second aspect of the present invention. The broadband light source 200 comprises: first and second gain mediums 210 and 215; first and second wavelength selective couplers 220 and 225; first and second pump light sources 230 and 235; a reflector 260; and first and second connectors 240 and 245. The broadband light source 200 according to this aspect of the invention is identical to the broadband light source 100 according to the first aspect of the present invention as shown in FIG. 1, except that the optical isolators are removed from the broadband light source 200, and first and second connectors 240 and 245 are added to the broadband light source 200. Therefore, a description of the same elements will not be given.

A first amplified spontaneous emission 280 is output to the rear of the first gain medium 210, and passes through the first wavelength selective coupler 220, and is then output to the outside though the first connector 240, which is disposed in a first output terminal 250 of the broadband light source 200. The first amplified spontaneous emission 280 outputs to the front of the first gain medium 210 is reflected by means of the reflector 260, and is then input to the first gain medium 210 again. The first amplified spontaneous emission 280 amplified again by the first gain medium 210 passes through the first wavelength selective coupler 220, and is then outputted to the outside though the first connector 240. A first pump light 270 left after exciting the first gain medium 210 is reflected by the reflector 260, and is then input to the first gain medium 210 again. Consequently, amplification efficiency is improved.

A second amplified spontaneous emission 285 output to the front of the second gain medium 215 passes through the second wavelength selective coupler 225. The emission 285 is then output to the outside though the second connector 245, which is disposed in a second output terminal 255 of the broadband light source 200. The second amplified spontaneous emission 285 is output to the rear of the second gain medium 215, and is reflected by the reflector 260. Then, the emission 285 is input to the second gain medium 215 again. The second amplified spontaneous emission 285 is amplified again by the second gain medium 215, and passes through the second wavelength selective coupler 225. Finally, the emission 285 is then output to the outside though the second connector 245. A second pump light 275 left after exciting the second gain medium 215 is reflected by the reflector 260, and is then input to the second gain medium 215 again. Consequently, amplification efficiency is improved.

Each of the first and second connectors 240 and 245 may include an optical fiber with an inclined end. Since the end of the optical fiber is inclined, the amount of light reflected from the inclined end of the optical fiber and inputted to the gain medium 210 is decreased. The inclined angle may be set to the Brewster's angle of the medium.

Figure 3:
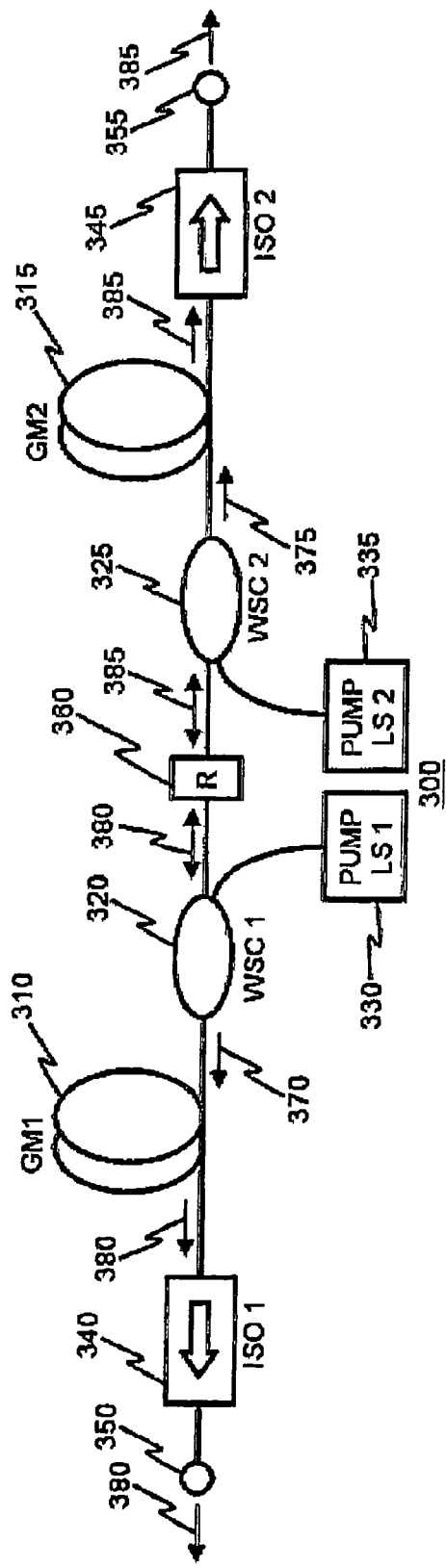
FIG. 3 is a schematic view illustrating the structure of a broadband light source according to a third aspect of the present invention.

FIG. 3 is a schematic view of the structure of a broadband light source 300 according to a third aspect of the present invention. The broadband light source 300 comprises: first and second gain mediums 310 and 315; first and second wavelength selective couplers 320 and 325; first and second pump light sources 330 and 335; a reflector 360; and first and second optical isolators 340 and 345. The broadband light source 300 according to this embodiment is identical to the broadband light source 100 according to the first aspect of the present invention as shown in FIG. 1, except that the positions of the first and second wavelength selective couplers are changed. Therefore, a description of the same elements will not be given.

The first wavelength selective coupler 320 is disposed between the first gain mediums 310 and the reflector 360, and the second wavelength selective coupler 325 is disposed between the second gain mediums 315 and the reflector 360.

A first amplified spontaneous emission 380 is output to the rear of the first gain medium 310, and then passes through the first optical isolator 340, where it is then output to the outside though a first output terminal 350 of the broadband light source 300. The first amplified spontaneous emission 380 is output to the front of the first gain medium 310 as it passes through the first wavelength selective coupler 320. This emission 380 is reflected by the reflector 360, and is then input to the first gain medium 310 again. The first amplified spontaneous emission 380 is then amplified again by the first gain medium 310, and passes through the first optical isolator 340, and where it is then output to the outside though the first output terminal 350 of the broadband light source 300.

A second amplified spontaneous emission 385 output to the front of the second gain medium 315 passes through the second optical isolator 345, and is then output to the outside though a second output terminal 355 of the broadband light source 300. The second amplified spontaneous emission 385 output to the rear of the second gain medium 315 passes through the second wavelength selective coupler 325, is reflected by the reflector 360, and is then input to the second gain medium 315 again. The second amplified spontaneous emission 385 is amplified again by the second gain medium 315 as it passes through the second optical isolator 345, and is then output to the outside through the second output terminal 355 of the broadband light source 300.

Figure 4:
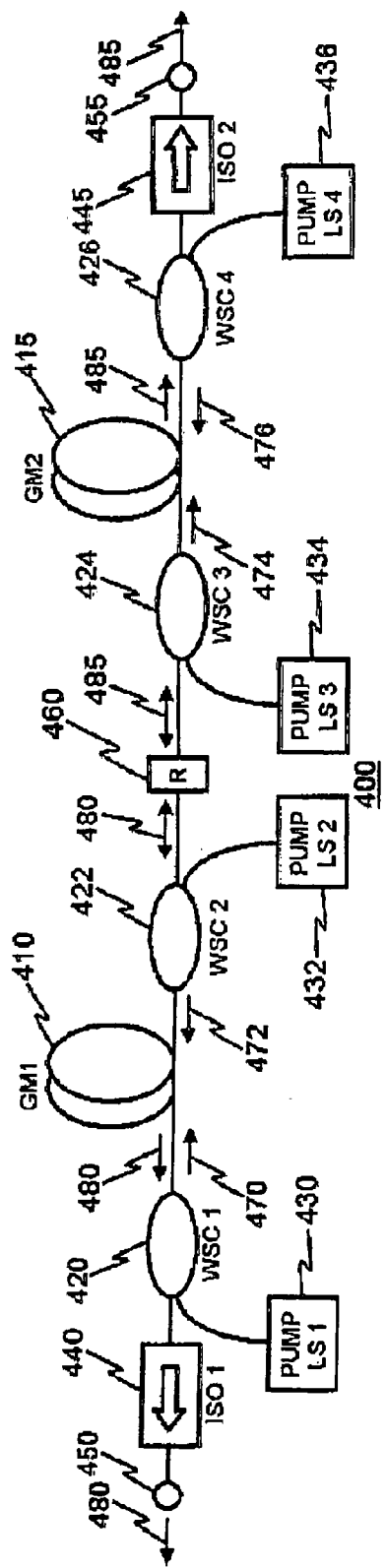
FIG. 4 is a schematic view illustrating the structure of a broadband light source according to a fourth preferred embodiment of the present invention.

FIG. 4 is a schematic view illustrating the structure of a broadband light source 400 according to a fourth aspect of the present invention. The broadband light source 400 includes first and second gain mediums 410 and 415; first to fourth second wavelength selective couplers 420, 422, 424, and 426; first to fourth pump light sources 430, 432, 434, and 436; a reflector 460; and first and second optical isolators 440 and 445. The broadband light source 400 according to this aspect of the invention is identical to the broadband light source 100 according to the first aspect of the present invention as shown in FIG. 1 except that the broadband light source 400 further comprises two more wavelength selective couplers and two more pump light sources. Therefore, a description of the same elements will not be given.

The first pump light source 430 outputs a first pump light 470 with a prescribed wavelength, and the first wavelength selective coupler 420 outputs the input first pump light 470 to the first gain medium 410. The second pump light source 432 outputs a second pump light 472 with a prescribed wavelength, and the second wavelength selective coupler 422 outputs the input second pump light 472 to the first gain medium 410. The third pump light source 434 outputs a third pump light 474 with a prescribed wavelength, and the third wavelength selective coupler 424 outputs the input third pump light 474 to the second gain medium 415. The fourth pump light source 436 outputs a fourth pump light 476 with a prescribed wavelength, and the fourth wavelength selective coupler 426 outputs the input fourth pump light 476 to the second gain medium 415.

A first amplified spontaneous emission 480 output to the rear of the first gain medium 410 passes through the first wavelength selective coupler 420 and the first optical isolator 440, and is then output to the outside though a first output terminal 450 of the broadband light source 400. The first amplified spontaneous emission 480 is output to the front of the first gain medium 410 and passes through the second wavelength selective coupler 422. The emission 480 is reflected by means of the reflector 460, and is then input to the first gain medium 410 again. The first amplified spontaneous emission 480 is then amplified again by the first gain medium 410 and passes through the first wavelength selective coupler 420 and the first optical isolator 440, and is then output to the outside though the first output terminal 450 of the broadband light source 400.

A second amplified spontaneous emission 485 output to the front of the second gain medium 415 and passes through the fourth wavelength selective coupler 426 and the second optical isolator 445, and is then output to the outside though a second output terminal 455 of the broadband light source 400. The second amplified spontaneous emission 485 output to the rear of the second gain medium 415 then passes through the third wavelength selective coupler 424, is reflected by means of the reflector 460, and is then input to the second gain medium 415 again. The second amplified spontaneous emission 485 is amplified again by the second gain medium 415 and passes through the fourth wavelength selective coupler 426 and the second optical isolator 445, wherein it is then output to the outside though the second output terminal 455 of the broadband light source 400.

As apparent from the above description, the present invention provides a broadband light source that is capable of outputting amplified spontaneous emissions, which are created in first and second gain mediums, to the outside through first and second output terminals, whereby intensity of the outputted light is large, and output efficiency is high. Consequently, the broadband light source according to the present invention is suitable for measuring characteristics of optical elements used for optical communication or is properly used in a WDM-PON. Also, one broadband light source according to the present invention performs the same functions as two conventional broadband light sources, whereby the broadband light source according to the present invention is economically realized, and integration efficiency of the broadband light source is increased.

Furthermore, the broadband light source according to the present invention can independently control output powers by using a reflector, whereby its application range is wide.

Although the preferred aspects of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dual-port broadband light source with independently controllable output powers, comprising:

a first gain medium having two ends;

a first input pump light for pumping the first gain medium so as to output a first amplified spontaneous emission through both ends of said first gain medium;
a second gain medium having two ends;
a second input pump light for pumping the second gain medium so as to output a second amplified spontaneous emission through both ends of said second gain medium; and
a reflector disposed between opposite inner ends of the first gain medium and the second gain medium for reflecting an input of the first and second amplified spontaneous emissions, a first output terminal and a second output terminal arranged at respective outer ends of the first gain medium and the second gain medium;
wherein the first and second amplified spontaneous emissions output from the first and second gain mediums are output to an exterior of the light source through the first and second output terminals.

2. The source as set forth in claim 1, further comprising:
a first pump light source for outputting the first input pump light with a predetermined wavelength;
a first wavelength selective coupler disposed between the first gain medium and the first output terminal for outputting the first input pump light to the first gain medium;
a second pump light source for outputting the second input pump light with a predetermined wavelength; and
a second wavelength selective coupler disposed between the second gain medium and the second output terminal for outputting the second input pump light to the second gain medium.

3. The source as set forth in claim 2, further comprising:
a first optical isolator disposed between the first wavelength selective coupler and the first output terminal for allowing the first amplified spontaneous emission to pass therethrough and intercept light traveling in an opposite direction of the first spontaneous emission; and
a second optical isolator disposed between the second wavelength selective coupler and the second output terminal for allowing the second amplified spontaneous emission to pass therethrough and intercept the light traveling in an opposite direction of the second spontaneous emission.

4. The source as set forth in claim 1, further comprising:
a first pump light source for outputting the first input pump light with a predetermined wavelength;
a first wavelength selective coupler disposed between the first gain medium and the reflector for outputting the first input pump light to the first gain medium;
a second pump light source for outputting the second input pump light with a predetermined wavelength; and
a second wavelength selective coupler disposed between the second gain medium and the reflector for outputting the second input pump light to the second gain medium.

5. The source as set forth in claim 1, further comprising:
a first optical isolator disposed between the first wavelength selective coupler and the first output terminal for allowing the first amplified spontaneous emission to pass therethrough and intercepting the light traveling in an opposite direction of the first spontaneous emission; and
a second optical isolator disposed between the second wavelength selective coupler and the second output terminal for allowing the second amplified spontaneous emission to pass therethrough and intercepting the light traveling in an opposite direction of the second spontaneous emission.

6. The source as set forth in claim 2, further comprising:
a first connector disposed in the first output terminal, the first connector having a first optical fiber with an inclined end; and
a second connector disposed in the second output terminal, the second connector having a second optical fiber with an inclined end.

7. The source as set forth in claim 1, further comprising:
a first pump light source for outputting the first input pump light with a predetermined wavelength;
a first wavelength selective coupler disposed between the first gain medium and the first output terminal for outputting the first input pump light to the first gain medium;
a second pump light source for outputting the second input pump light with a predetermined wavelength;
a second wavelength selective coupler disposed between the first gain medium and the reflector for outputting the second input pump light to the first gain medium;
a third pump light source for outputting a third input pump light with a predetermined wavelength;
a third wavelength selective coupler disposed between the second gain medium and the reflector for outputting the third input pump light to the second gain medium;
a fourth pump light source for outputting a fourth input pump light with a predetermined wavelength; and
a fourth wavelength selective coupler disposed between the second gain medium and the second output terminal for outputting the fourth input pump light to the second gain medium.

8. The source as set forth in claim 1, further comprising:
a first optical isolator disposed between the first wavelength selective coupler and the first output terminal for allowing the first amplified spontaneous emission to pass therethrough and intercepting the light traveling in an opposite direction to the first amplified spontaneous emission; and
a second optical isolator disposed between the fourth wavelength selective coupler and the second output terminal for allowing the second amplified spontaneous emission to pass therethrough and intercepting the light traveling in an opposite direction to the first amplified spontaneous emission.

9. The source as set forth in claim 1, wherein the first gain medium and the second gain medium are comprised of one of an erbium doped fiber and an erbium doped planar light wave circuit.

10. The source as set forth in claim 1, wherein the first gain medium and the second gain medium are comprised of one of a thulium doped fiber and a thulium doped planar light wave circuit.

11. The source as set forth in claim 1, wherein the first gain medium and the second gain medium are comprised of one of a praseodymium doped fiber and a praseodymium doped planar light wave circuit.

12. A method of providing a dual-port broadband light source with independently controllable output, comprising the steps of:
(a) providing a first gain medium having two ends;
(b) arranging a first input pump light for pumping the first gain medium so as to output a first amplified spontaneous emission through both ends of said first gain medium;
(c) providing a second gain medium having two ends;

(d) arranging a second input pump light for pumping the second gain medium so as to output a second amplified spontaneous emission through both ends of said second gain medium; and (e) disposing a reflector between opposite inner ends of the first gain medium and the second gain medium for reflecting an input of the first and second amplified spontaneous emissions;

(f) arranging a first output terminal and a second output terminal arranged at respective outer ends of the first gain medium and the second gain medium; and (g) outputting one of the first and second amplified spontaneous emissions from the first and second gain mediums to an exterior of the light source through the first and second output terminals.

13. The method according to claim 12, wherein the first gain medium and the second gain medium are comprised of one of an erbium doped fiber and an erbium doped planar light wave circuit.

14. The method according to claim 12, wherein the first gain medium and the second gain medium are comprised of one of a thulium doped fiber and a thulium doped planar light wave circuit.

15. The method according to claim 12, wherein the first gain medium and the second gain medium are comprised of one of a praseodymium doped fiber and a praseodymium doped planar light wave circuit.

16. The method according to claim 12, further comprising:

providing a first pump light source for outputting the first input pump light with a predetermined wavelength;

arranging a first wavelength selective coupler disposed between the first gain medium and the first output terminal for outputting the first input pump light to the first gain medium;

providing a second pump light source for outputting the second input pump light with a predetermined wavelength; and arranging a second wavelength selective coupler disposed between the second gain medium and the second output terminal for outputting the second input pump light to the second gain medium.

* * * * *